UNITED STATES PATENT OFFICE.

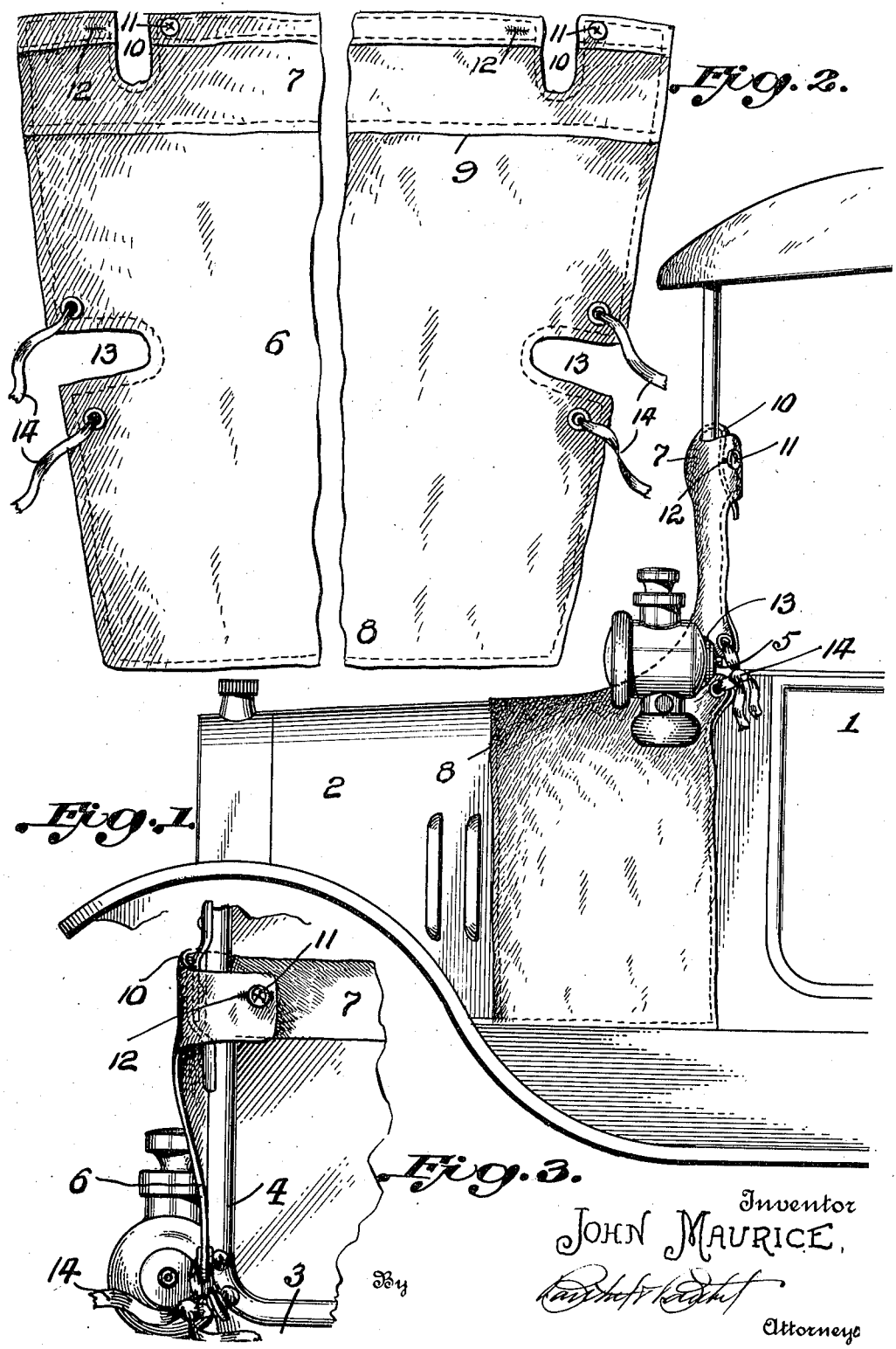

JOHN MAURICE, OF ECORSE, MICHIGAN.

AUTOMOBILE-COVER.

1,292,501.	Specification of Letters Patent.	Patented Jan. 28, 1919.

Application filed August 15, 1918. Serial No. 249,933.

*To all whom it may concern:*

Be it known that I, JOHN MAURICE, a citizen of the United States of America, residing at Ecorse, in the county of Wayne and State of Michigan, have invented certain new and useful Improvements in Automobile-Covers, of which the following is a specification, reference being had therein to the accompanying drawings.

My invention aims to provide a novel cover for a portion of an automobile engine hood and the dash of the automobile, particularly at the juncture of the engine hood with the dash, to exclude rain, snow and other elements, which pass between the hood and the dash and cause trouble such as short circuits, in connection with the ignition system of the automobile. Such troubles are experienced when driving several well known makes of cars during a storm, and with the cover in place, the juncture between the engine hood and the dash is well protected, consequently the ignition system of the automobile can be maintained in operative condition so far as external forces are concerned.

My invention further aims to accomplish the above result by a simple, durable and inexpensive cover that may be easily and quickly installed for the purpose for which it is intended, and when not used for such purpose, the cover may be employed as ground cloth or lap robe.

Reference will now be had to the drawing, wherein—

Figure 1 is a side elevation of a portion of an automobile, showing the cover in position;

Fig. 2 is a plan of the cover, partly broken away, and

Fig. 3 is the rear elevation of a portion of a windshield showing a portion of the cover attached thereto.

In the drawing, the reference numeral 1 denotes an automobile body having a dash 3 and joining the dash is an engine hood 2. The dash 3 supports a conventional form of windshield 4 and lamp brackets 5, such elements having been illustrated as of a conventional form common to a well known type of automobile.

The cover is designated 6 and is made of a pliable piece of waterproof cloth or a piece of fabric that is light and durable and capable of protecting from the elements any structure covered thereby. The cover may be considered as tapering in plan, that is, its rear edge portion 7 is of greater width than its front edge portion, the side edges of the cover tapering inwardly from the rear edge thereof to the front edge, as clearly shown in Fig. 2.

In width the cover is sufficient to extend crosswise of the engine hood 2 and hang down the sides thereof, as shown in Fig. 1, and in length the cover is sufficient to extend over the rear portion of the engine hood and upwardly over the lower section of the windshield 4.

The rear edge portion of the cover has a reinforcement 9 and the rear edge portion is cut away, as at 10, to provide clearance for the frame of the windshield 4. It is necessary to slightly open the upper section of the windshield 4 in order to extend the rear edge portion 7 of the cover over the upper edge of the lower section of the windshield, and with the cut away portions 10 adjacent the side edges of the cover 6, the side edges of the cover can be extended rearwardly, as shown in Fig. 1 and the rear edge portion 7 buttoned or otherwise fixed around the frame of the windshield 4. To accomplish this, the rear edge portion 7 at the sides of the cut away portions 10, has buttons 11 and buttonholes 12, constituting suitable fastening means for connecting the cover around the windshield frame.

The side edges of the cover are cut away as at 13, so that these edges of the cover may be fitted around the lamp brackets 5 and thus coöperate with the windshield in maintaining the cover in place, particularly at the juncture of the engine hood 2 with the dash 3 of the automobile. As a suitable fastening means for the cut away side edges of the cover, tapes or strings may be employed and tied about the lamp brackets, as shown in Fig. 1.

The cover 6 around the cut away or recessed portions 10 and 13 thereof is stitched or reinforced and with the cover in place, it is practically impossible for the elements to interfere with any electrical connections at the spark plugs of the engine, coil boxes of the automobile dash, or any other electrical devices forming part of the ignition system in proximity to the rear end of the engine hood 2.

It is thought that the utility of the cover will be apparent without further description, and while in the drawing there is illustrated a preferred embodiment of my invention, it is to be understood that the construction of the cover may be changed without departing from the scope of the appended claims.

What I claim is:—

1. A cover adapted to be placed over an automobile engine hood and the lower section of a windshield to exclude the elements at the juncture of the engine hood with the dash of an automobile, said cover having its rear end portion cut away to provide clearance for the windshield frame and its side edges cut away to provide clearance for lamp brackets, and means carried by the rear and side edges of the cover adapted for securing said cover in place.

2. The combination with an automobile having an engine hood, a windshield and lamp brackets, of a waterproof cover adapted to be placed over said engine hood and the lower section of said windshield, said cover having its rear and side edges cut away to provide clearance for the windshield frame and said lamp brackets, and means at the cut away edges of said cover adapted for detachably holding said cover in engagement with said windshield and said lamp brackets.

In testimony whereof I affix my signature in the presence of two witnesses.

JOHN MAURICE.

Witnesses:
ANNA M. DORR,
KARL H. BUTLER.